United States Patent
Miyamoto et al.

(10) Patent No.: US 8,023,802 B2
(45) Date of Patent: Sep. 20, 2011

(54) IMAGE PROCESSING APPARATUS

(75) Inventors: Katsuhiro Miyamoto, Kanagawa (JP); Takashi Yamamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 148 days.

(21) Appl. No.: 12/181,233

(22) Filed: Jul. 28, 2008

(65) Prior Publication Data
US 2009/0044120 A1 Feb. 12, 2009

Related U.S. Application Data

(63) Continuation of application No. 10/501,877, filed on Jul. 20, 2004, now Pat. No. 7,496,278.

(30) Foreign Application Priority Data

Jan. 22, 2002 (JP) .................. 2002-012833

(51) Int. Cl.
*H04N 5/92* (2006.01)
(52) U.S. Cl. ......... 386/326; 715/204; 715/243; 715/723
(58) Field of Classification Search ............. 386/95, 386/326; 715/723, 204, 243
See application file for complete search history.

(56) References Cited

U.S. PATENT DOCUMENTS

| 5,045,967 | A | 9/1991 | Igarashi | |
|---|---|---|---|---|
| 5,241,659 | A | 8/1993 | Parulski | |
| 6,885,408 | B2 | 4/2005 | Hirano | |
| 2001/0035875 | A1* | 11/2001 | Suzuki et al. | 345/723 |
| 2005/0210414 | A1* | 9/2005 | Angiulo et al. | 715/838 |

FOREIGN PATENT DOCUMENTS

CN 1063188 A 7/1992

OTHER PUBLICATIONS

Chinese Office Action dated Jul. 21, 2006, issued during prosecution of related Chinese Application No. 03802509.4.

* cited by examiner

*Primary Examiner* — Thai Tran
*Assistant Examiner* — Girumsew Wendmagegn
(74) *Attorney, Agent, or Firm* — Fitzpatrick, Cella, Harper & Scinto

(57) ABSTRACT

A signal processing apparatus, the operation of which is controlled by a remote controller, designates procedure for reproducing an image signal stored on a recording medium; allocates a reproduction function corresponding to the designated reproduction procedure to the operating key of the remote controller; generates reproduction management data that includes operating key information indicating the operating key to which the reproduction function is allocated, and reproduction procedure information indicating the designated reproduction procedure; and writes the reproduction procedure management information to the recording medium.

9 Claims, 13 Drawing Sheets

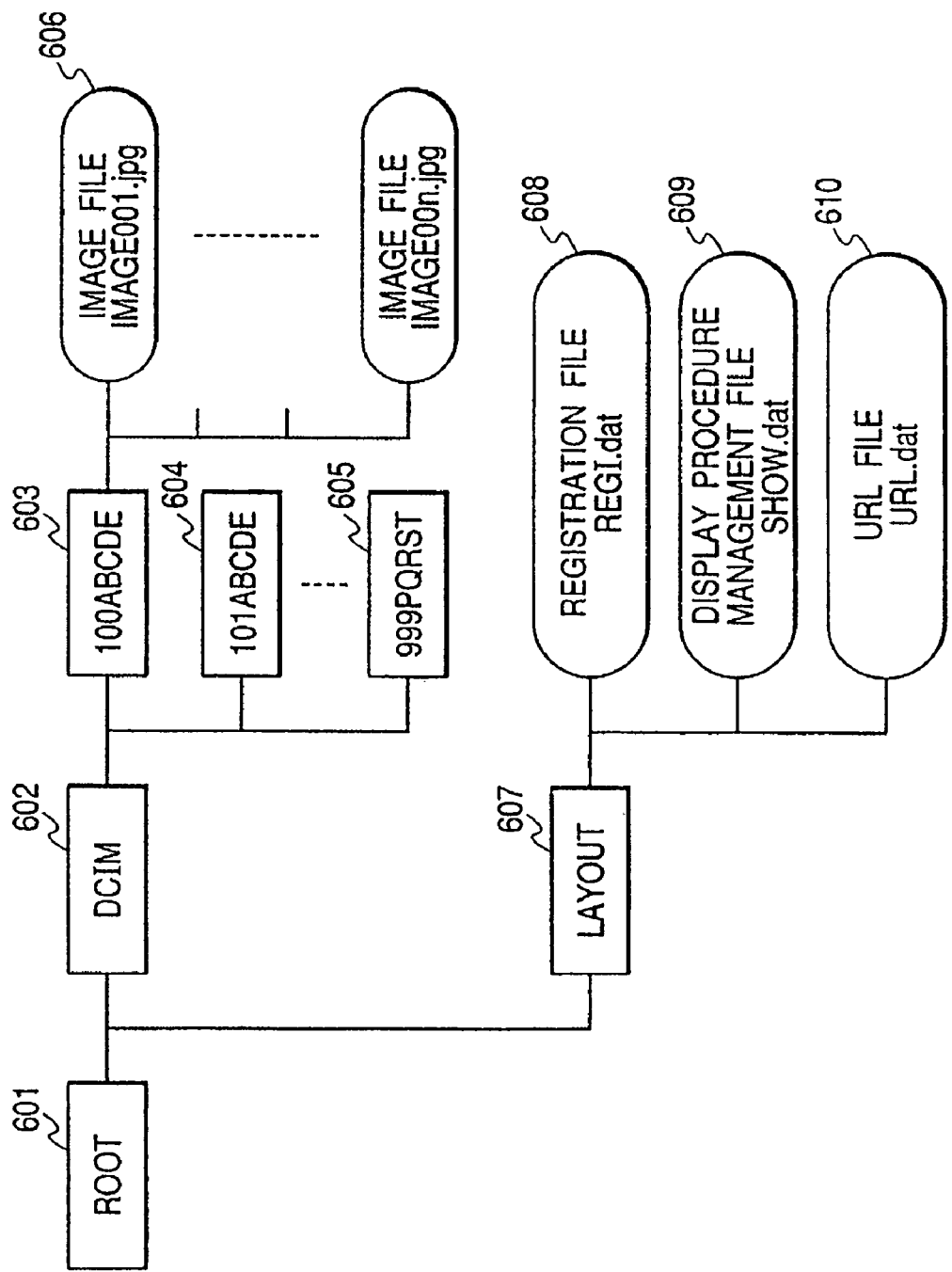

FIG. 7

REGISTRATION FILE

[HDR]
REGISTRATION FILE ID
FILE LENGTH
NUMBER OF SECTIONS
NUMBER OF PARAMETERS
[BASE]
 • REGISTERED FILE NAME
 • REGISTERED FILE DIRECTORY
 • LAYOUT No.
 • SLIDE GROUP ID
 • SLIDE POSITION No.
 • DISPLAY ORDER No.
     ⋮
 • OPTION SETTING
OPTION
 • DISPLAY POSITION X
 • DISPLAY POSITION Y
 • DISPLAY SIZE SX
 • DISPLAY SIZE SY
 • NUMBER OF DISPLAY COLORS CO

[BASE]

⋮

[BASE]

⋮

[BASE]

DISPLAY PROCEDURE MANAGEMENT FILE

[HDR]
DISPLAY PROCEDURE MANAGEMENT FILE ID
FILE LENGTH
NUMBER OF SECTIONS
NUMBER OF PARAMETERS
[SLIDE]
 • SLIDE GROUP ID
 • NUMBER OF REGISTERED FILES
 • LAYOUT No.
 • REMOTE CONTROL CODE 1
 • REMOTE CONTROL CODE 2
   ⋮
 • REMOTE CONTROL CODE n

[SLIDE]
 • SLIDE GROUP ID
 • NUMBER OF REGISTERED FILES
 • LAYOUT No.
 • REMOTE CONTROL CODE 1
 • REMOTE CONTROL CODE 2
   ⋮
 • REMOTE CONTROL CODE n

⋮

[SLIDE]
 • SLIDE GROUP ID
 • NUMBER OF REGISTERED FILES
 • LAYOUT No.
 • REMOTE CONTROL CODE 1
 • REMOTE CONTROL CODE 2
   ⋮
 • REMOTE CONTROL CODE n

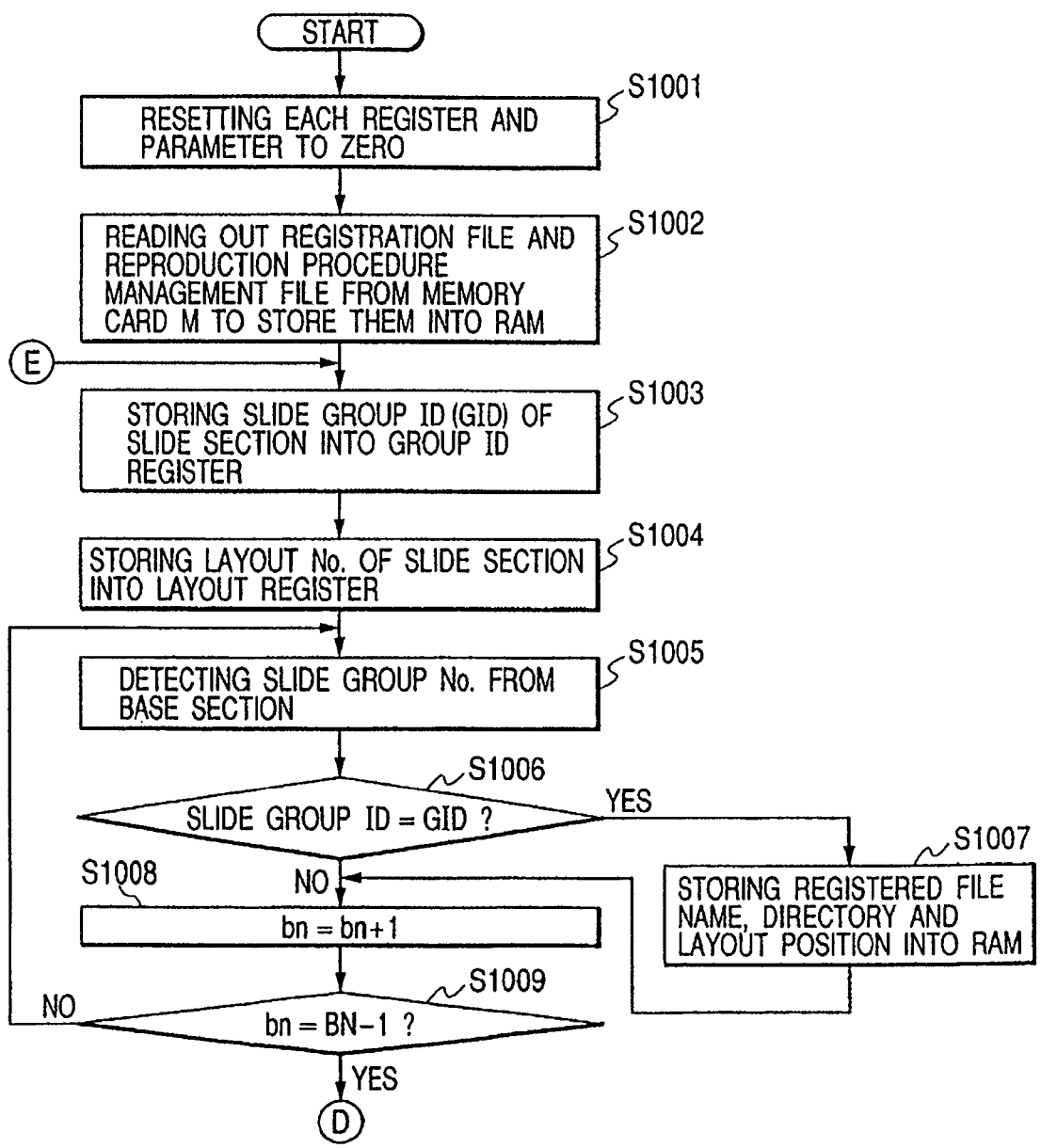

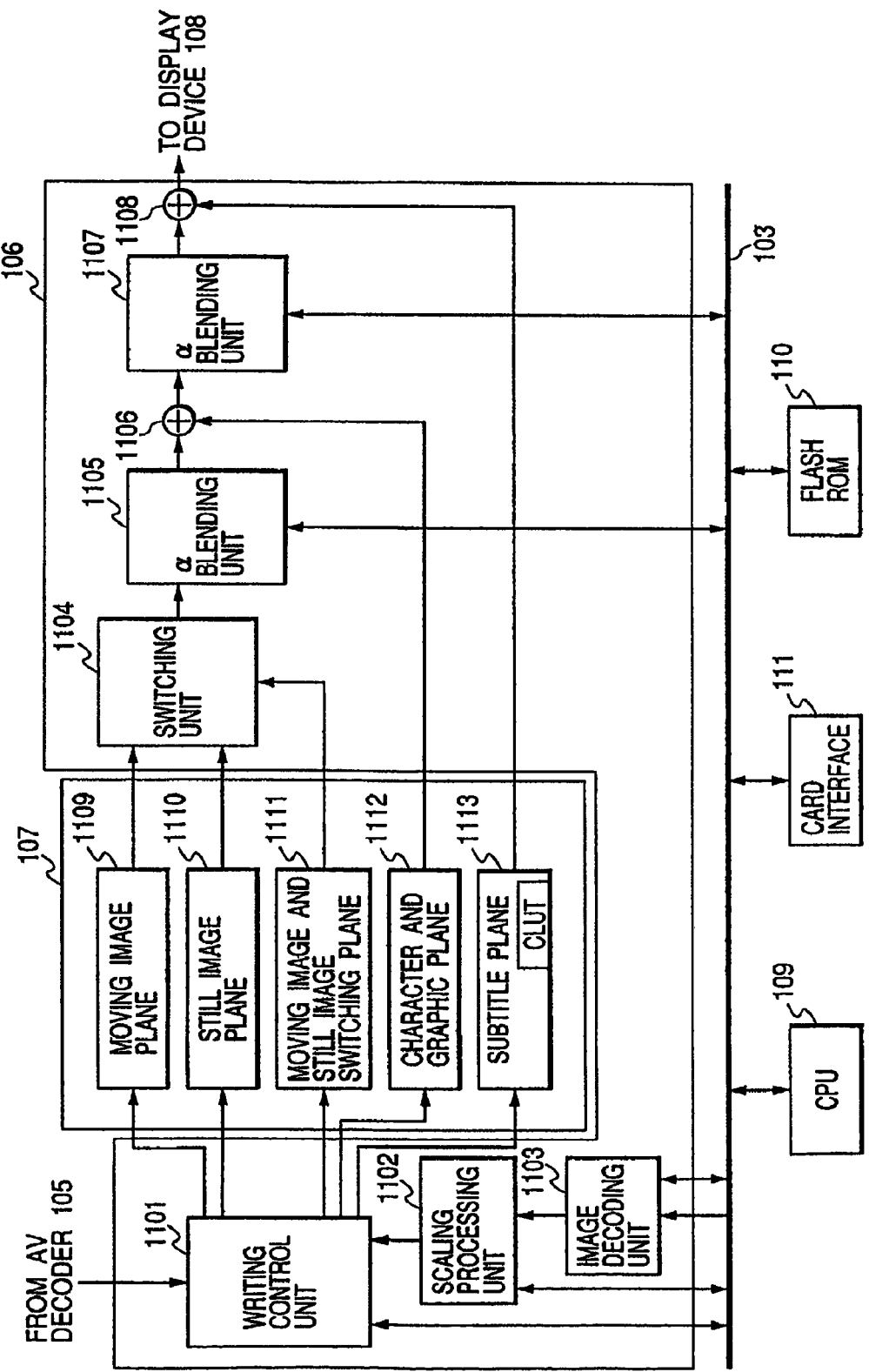

IMAGE PROCESSING APPARATUS

This application is a divisional application of U.S. Patent Application Ser. No. 10/501,877, filed on Jul. 20, 2004 (pending).

TECHNICAL FIELD

The present invention relates to a signal processing apparatus, and more particularly to the setting up of procedure for the reproduction of image signals.

BACKGROUND ART

A digital broadcasting system has been developed that can transmit multiplexed digital video and audio information and data broadcasting information (including still image data), and can display data with synchronization between the video data and the audio data.

For example, with the BS digital broadcasting system employed in Japan, a stream of digital video data and audio data is compressed and encoded using MPEG-2 to provide an MPEG-2 transport stream, which is transmitted as packets. Furthermore, still image data, such as advertisement data, are compressed and encoded in accordance with the JPEG standards to be formed into packets, and these packets are repetitively transmitted using the Data Carousel method.

A television receiver separates the packet data into video data, audio data and data broadcasting data, and decodes the video and audio data to obtain the original images and sounds. In addition, the television receiving apparatus decodes the data broadcasting data in accordance with its form.

Also, a high vision compatible plasma television, having a display resolution equal to or higher than 1280×720 pixels, has been produced as a display device to be used for the television receiver, and the display resolution and the number of bits (the pixel values) are diversifying.

As apparatuses for handling video signals, digital cameras that employ CCDs to obtain images have taken the place of conventional silver halide photographic cameras and have been practically employed. Since the digital camera stores, as digital data, images obtained into memory media, such as semiconductor memories, and since such media can be easily transported, image data stored therein can be easily transferred to personal computers for display or printing.

In addition, a digital television receiver is available that is equipped with a card slot into which a memory card, on which image data obtained by a digital camera are stored, can be inserted and that displays on a television screen images read out from the memory card.

Furthermore, there may be a case wherein, for a system that employs a high-performance television that can receive a digital broadcast, to display digital image data obtained by a digital camera, slides showing reproduction procedure, or a specific display layout, are arbitrarily set up and displayed.

However, even when the order for the display of such the slides is set up, the information for this setup is not stored, and the setup must be repeated when digital image data stored on the same memory card are to be displayed by another television receiver.

That is, the display order, the display layout and the remote control method must again be set up, and this is very tiresome requirement.

Further, since generally only one plane (a still image plane) of a video memory is used by a television receiver for the display of a still image, the writing to video memory of the data of an image must be delayed until the display of a preceding slide has been completed. Therefore, each time slides are changed, the display of a new image is delayed by a time period required to write the next slide data into the video plane.

As another vexing problem, since the management of the video planes of television receivers differ depending on the broadcast reception standards adopted by individual nations, the worldwide display on televisions of digital image data, such as may be obtained by a specific digital camera, is not possible.

DISCLOSURE OF THE INVENTION

It is one objective of the present invention to resolve the above described problems.

It is another objective of the present invention to enable the easy setup of the image signal reproduction procedure for an apparatus controlled by a remote controller.

To resolve the above problems and to achieve these objectives, according to one aspect of the present invention, the present invention proposes a signal processing apparatus operated by a remote controller, comprising:

a designation unit arranged to designate the reproduction procedure of image signals recorded on a recording medium;

a management data processing unit arranged to allocate, to an operating key of the remote controller, a reproduction function that corresponds to the designated reproduction procedure, and generate reproduction procedure management information that include operating key information which indicate the operating key to which the reproduction function is allocated, and reproduction procedure information which indicate the designated reproduction procedure; and a recording unit arranged to record the reproduction procedure management information on the recording medium.

Other objectives and features of the present invention will become apparent during the course of the following detailed description, given for the embodiments of the invention while referring to the drawings.

BRIEF DESCRIPTION OF THE DRAWINGS

FIG. 6 is a diagram showing the directories of a memory card;

FIG. 7 is a diagram showing the contents of a registration file;

FIG. 8 is a diagram showing the contents of a display procedure management file;

FIG. 11 is a diagram showing the essential configuration of a television receiver according to a second embodiment of the present invention.

DETAILED DESCRIPTION OF THE PREFERRED EMBODIMENTS

The preferred embodiments of the present invention will now be described while referring to the accompanying drawings.

Figure 1:
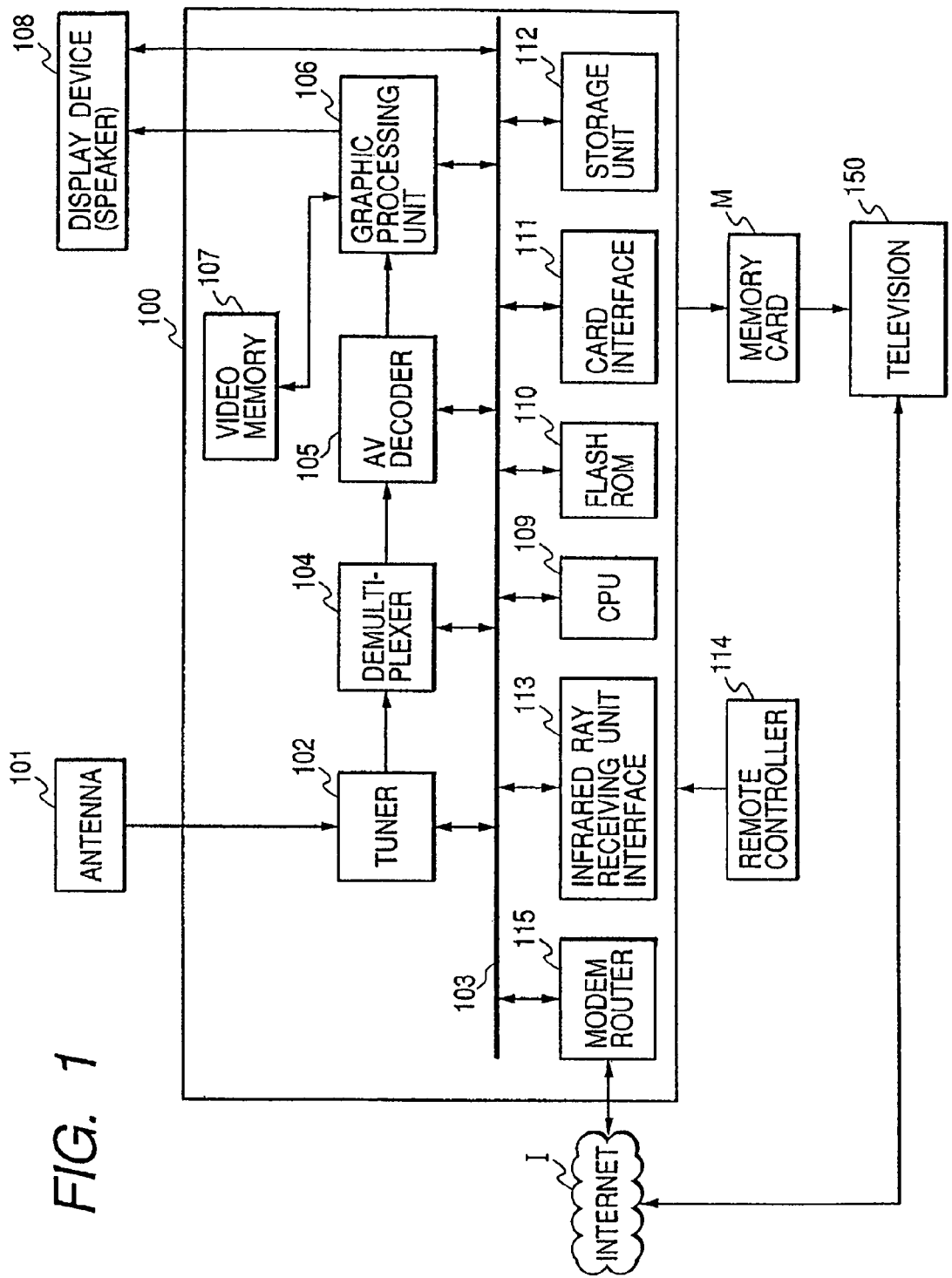
FIG. 1 is a diagram showing the configuration of a television broadcast receiving system according to a first embodiment of the present invention.

FIG. 1 is a diagram showing the configuration of a digital television system according to a first embodiment of the present invention. In FIG. 1, digital television receivers (hereinafter referred to simply as receivers) 100 and 150 have the same configuration, and are connected across the Internet I.

Also in FIG. 1, an antenna 101 is used to receive a television signal transmitted by a broadcast satellite or by a broadcasting radio wave, such as a ground wave. A tuner 102 converts into a digital signal a television signal received at the antenna 101, demodulates modulated images and sounds, and converts obtained video and audio data into an MPEG-2 transport stream. A bus 103 is used to transfer still image data and various control data. A demultiplexer 104 separates a received transport stream into compressed video data packets, compressed audio data packets and data broadcast packets.

An AV decoder 105 decodes video signals and audio signals obtained by the demultiplexer 104. A graphic processing unit 106 converts the display format (the number of pixels, the frame frequency, or the scanning method) of video data received from the AV decoder 105, or manages the plane of still image data received from a CPU 109, via the bus 103, and draws images to superimpose on the still image data the video data received from the AV decoder 105.

A video memory 107 is used to store video data and still image data displayed on a display device 108. The display device 108, on which video data is displayed, includes a loudspeaker for outputting television broadcast sounds. The CPU 109 controls the individual sections of the receiver 100, and has a function of decoding of compressed still image data using software. Further, the CPU 109 incorporates a RAM for an execution of program and storing of temporary data.

A writable flash ROM 110 is used to store the program used for the CPU 109 and data of a display resolution and the number of colors relative to each layout number, which will be described later. A card interface 111 is used to transfer data stored on a memory card M to the CPU 109. A storage unit 112 stores digital broadcast data and image data read out from the memory card M, and can be an arbitrary form, such as a hard disk drive, a DVD-RAM or a semiconductor memory.

An infrared ray receiving unit interface 113 receives infrared ray data from a remote controller 114 and converts that data into an electric signal. The remote controller 114 is employed by a user to select a graphics display button while watching the display screen of the display device 108 or to select a television channel.

A modem router 115 permits the exchange of data between the Internet I and the receiver 100. This modem router 115 is changed depending on the infrastructure connected to the Internet I. For example, when a cable is connected, the modem router 115 is a cable modem router, and when an ADSL (Asymmetric Digital Subscriber Line) using a telephone line is connected, the modem router 115 is an ADSL modem router.

An explanation will now be given for an operation wherein the receiver 100 sets the procedure for reproducing image data stored on the memory card M.

First, an explanation will be given for the processing wherein the receiver 100 sets up procedure for reproducing image data stored on the memory card M, and stores the procedure on the memory card M.

Figure 2:
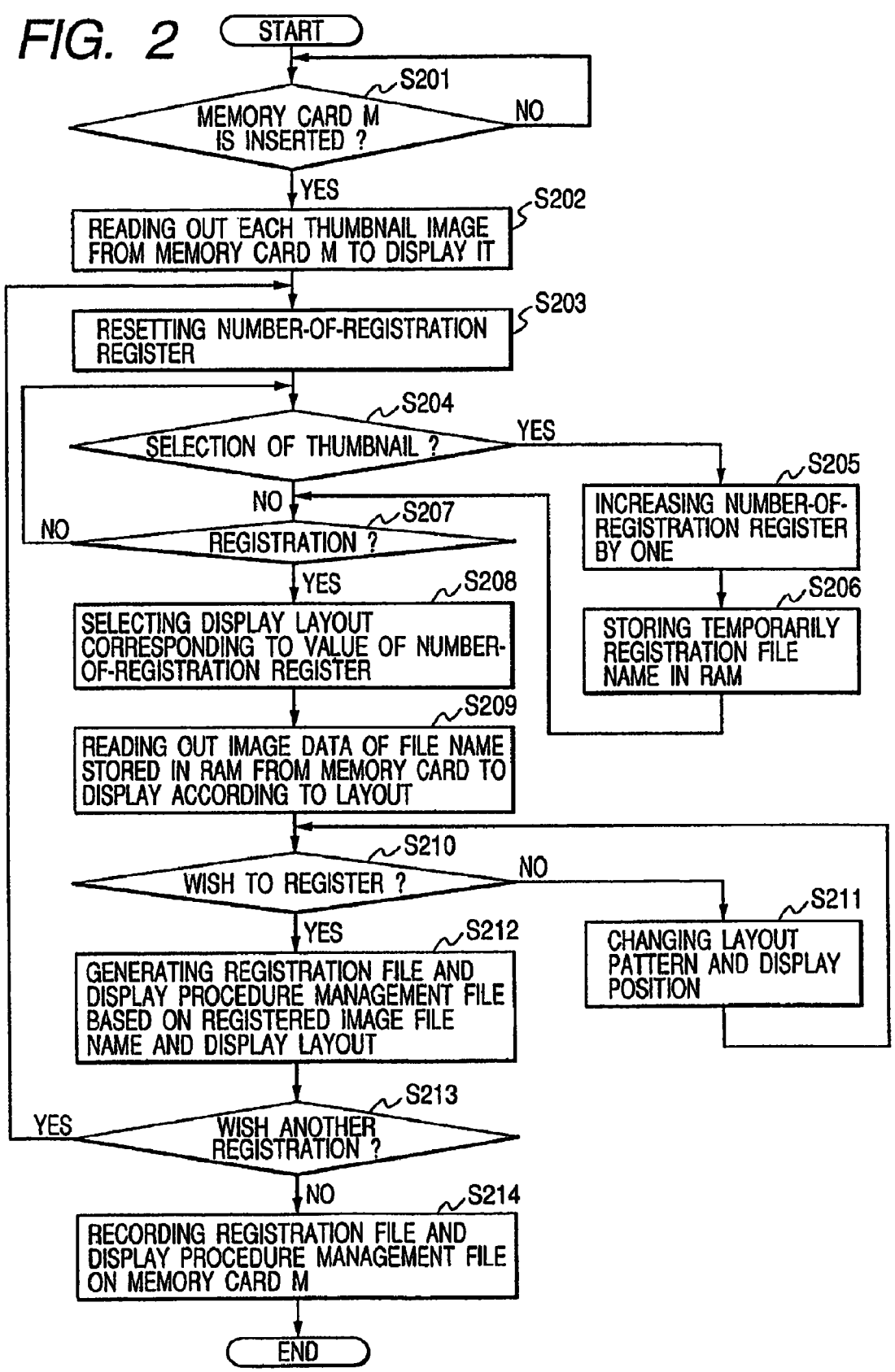
FIG. 2 is a flowchart for explaining the operation for setting up the procedure for the reproduction of image data.

FIG. 2 is a flowchart showing the processing performed by the CPU 109 of the receiver 100 when setting up the reproduction procedure.

In FIG. 2, when a reproduction procedure setting process is instructed by the remote controller 114, first, the CPU 109 confirms that the memory card M is inserted into the memory card slot of the card interface 111 (step S201). Then, the CPU 109 reads out thumbnail image data from a digital image data file stored on the memory card M, and transmits the thumbnail image data through the bus 103 to the graphic processing unit 106. The graphic processing unit 106 generates the display picture screen in FIG. 3, based on the thumbnail image data, and transmits the display picture screen to the display device 108 (step S202).

The structure of a file on the memory card M is shown in FIG. 6. Under a route directory 601 of the memory card M, there are directories DCIM 602 and LAYOUT 607, and under the DCIM 602, there are several sub-directories 603, 604 and 605. Under each of the sub-directories 603 to 605, there are image files 606, which include video and audio data obtained by a digital camera or a digital video camera, and thumbnail image data. A plurality of image files 606 may be located under the directory 603 or may be located under the other directories 604 and 605.

Figure 3:
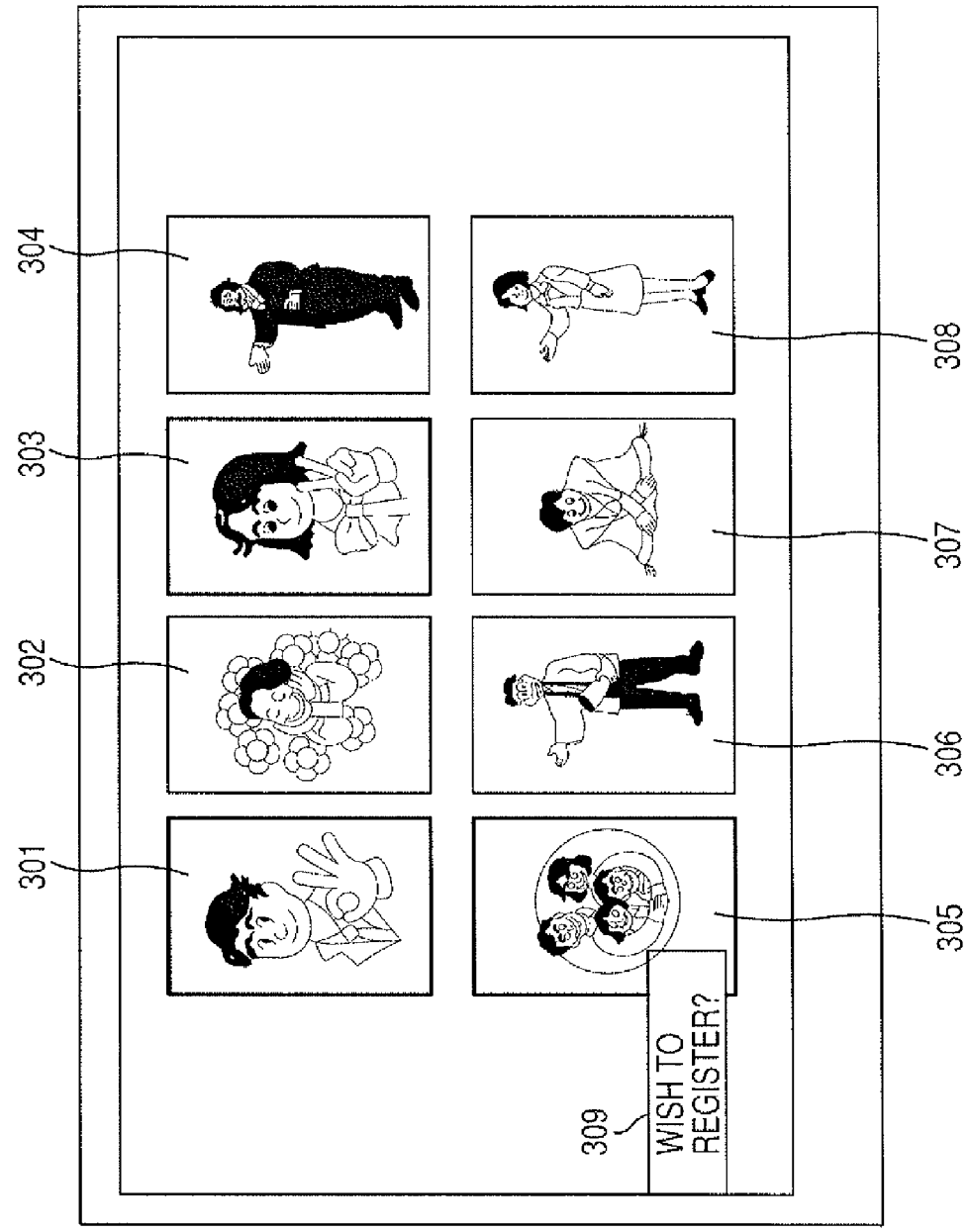
FIG. 3 is a diagram showing a display picture screen after the reproduction procedure is set up.

FIG. 3 is a diagram showing an example picture screen display of thumbnail images. In this embodiment, as is shown in FIG. 3, a list of thumbnail images 301 to 308 of image data read out from the memory card M is displayed, and a cursor frame is provided to highlight one of the displayed thumbnail images. In the example in FIG. 3, the added cursor frame is positioned around the image 305; however, by manipulating the direction keys on the remote controller 114, a user can move the cursor frame in four directions of up, down, right and left.

Figure 5:
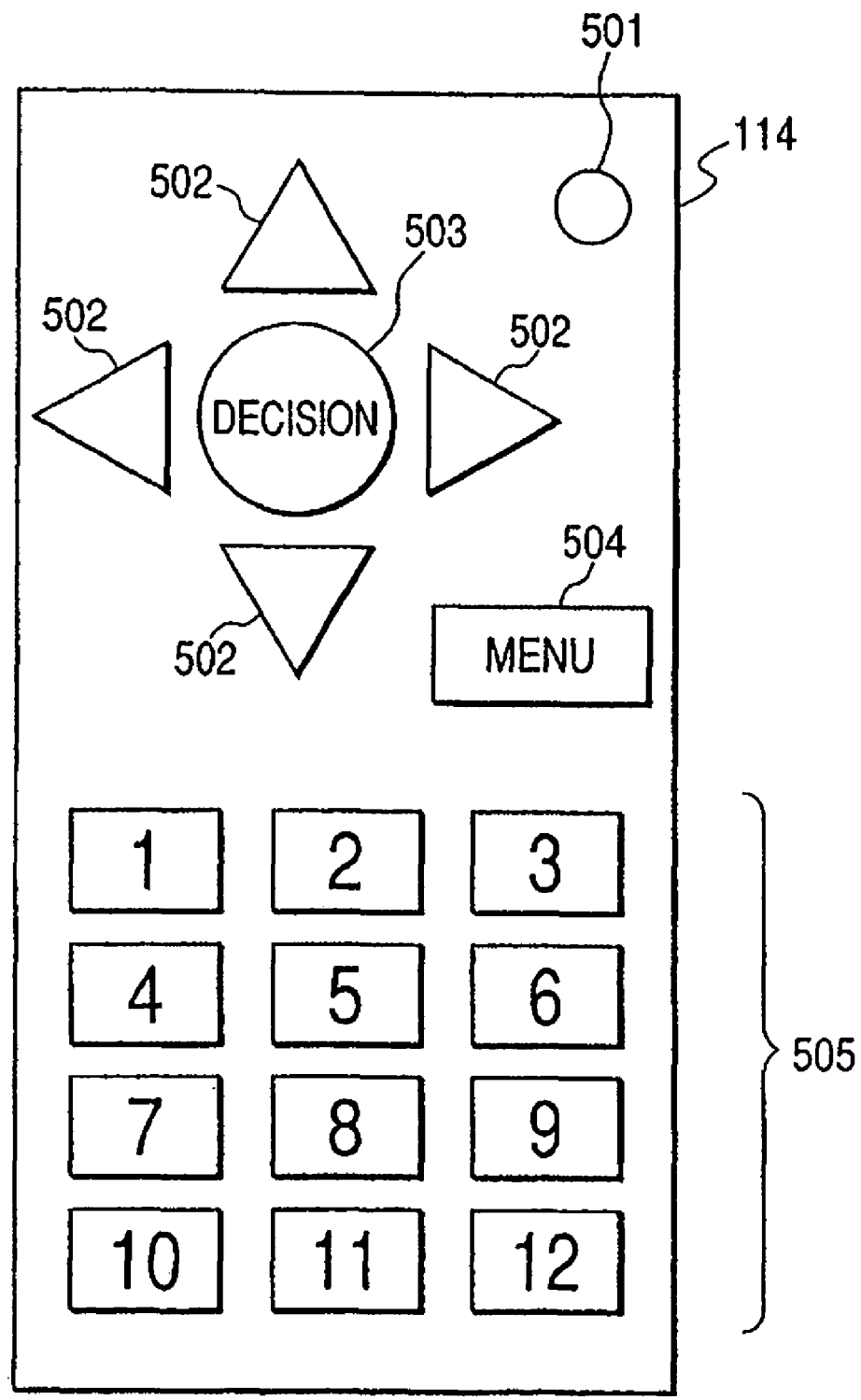
FIG. 5 is a diagram showing the configuration of a remote controller.

FIG. 5 is a diagram showing an example configuration for the remote controller 114. In FIG. 5, the remote controller 114 comprises a power key 501, direction keys 502, a decision key 503, a menu key 504 and number keys 505.

The key code of an operating key manipulated on the remote controller 114 is output by the remote controller 114 and received by the infrared ray receiving interface 113, and is then transmitted to the CPU 109. The CPU 109 identifies the key code (up, down, right or left) and, in accordance with the key code, transmits to the graphic processing unit 106 drawing data which includes the cursor frame that is moved.

When the list of thumbnail images 301 to 308 is displayed in this manner, the CPU 109 resets the value held by the internal number-of-registration register (step S203).

Then, when the decision key 503 on the remote controller 114 is manipulated, it is ascertained that the thumbnail image whereat the cursor frame is currently positioned is selected (step S204) and the value held by the number-of-registration register is incremented by one (step S205). Subsequently, the file name of the still image corresponding to the selected thumbnail image is temporarily stored in the internal RAM (step S206).

Following the manipulation of the decision key 503, the CPU 109, controls the graphic processing unit 106 to display a thick frame for the selected thumbnail image to indicate that a selection is made, and to display a message 309, "Wish to register?". In FIG. 3, the images 301 and 303 are selected, and the message 309 is displayed.

When a user who has completed the selection of all desired thumbnail images moves the cursor to the location of the message 309 and manipulates the decision key 503, the CPU 109 reads out from the RAM the value held by the number-of-registration register, selects a display layout that corresponds to the value, and reads banner information from the flash ROM 110 (steps S207 and S208). Furthermore, the CPU 109 reads out from the memory card M the image data of the file name stored in the RAM, and transmits the image data to the AV decoder 105. Thereafter, the AV decoder 105 decodes the image data and outputs the thus obtained data to the graphic processing unit 106, and the graphic processing unit 106 displays that image data in accordance with the selected display layout (step S209). The CPU 109 further transmits to the graphic processing unit 106 the image data of a confirmation screen that is used to determine whether an image should be registered, to display the image data.

Figure 4:
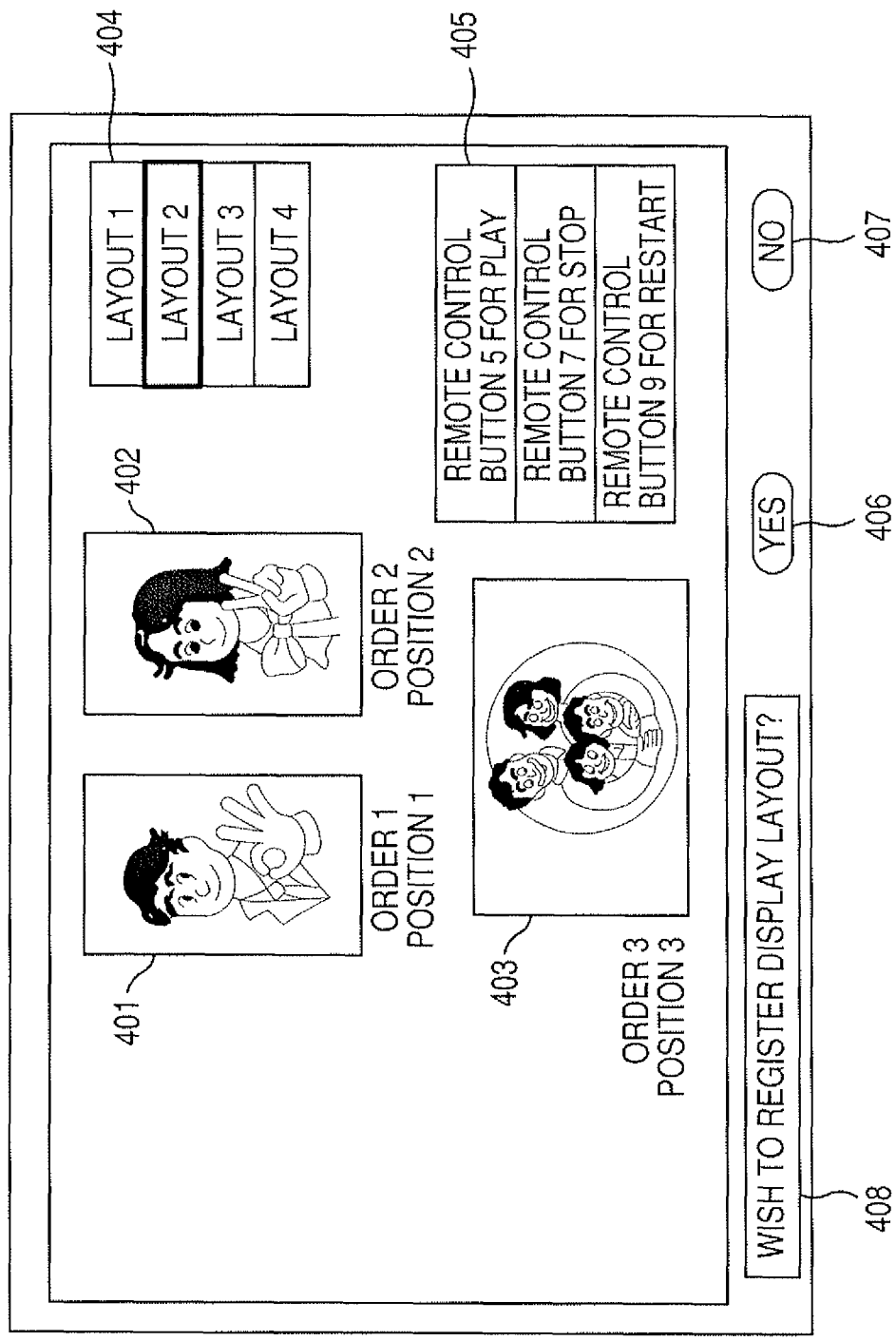
FIG. 4 is a diagram showing an example display layout.

FIG. 4 is a diagram showing an example registration screen for the display layout.

For example, when the thumbnail images 301, 303 and 305 in FIG. 3 are selected, the number of registered screens is three. And since the number of registered picture screens is three, the CPU 109 selects, from among multiple sets of display layout data that are stored in the flash ROM 110, one of display layout data for which the number of displayed picture screens is three. In FIG. 4, a display layout is selected wherein, to display on the screen the images selected in FIG. 3, the two images 301 and 303 are arranged at upper positions 401 and 402 and the image 305 is arranged at a lower position 403.

In FIG. 4, buttons 406 and 407, together with a message 408 of "Wish to register display layout?", are displayed, and a user, upon deciding that the current display layout is satisfactory, employs the remote controller 114 to move the focus to the button 406 and manipulates the decision key 503 (step S210).

When, however, the user decides that the display layout is not satisfactory, he or she employs the remote controller 114 to move the focus to the button 407 and manipulates the decision key 503. The CPU 109 then selects, from among the display layout data stored in the flash ROM 110, an other one of the layouts for which the number of display picture screens is three, and controls the graphic processing unit 106 to use this layout for the display of the images (step S211).

In this embodiment, as is shown in FIG. 4, images 404, representing display layout choices are displayed on a confirmation screen. In the example in FIG. 4, four different layouts 1 to 4 are provided as display layout choices, and layout 2 is selected. Under these conditions, each time the button 407 is manipulated the CPU 109 reads out layout data for the next choice from the flash ROM 110, and changes the display picture screen. Furthermore, the display images can be replaced, and when a user moves the focus to one of the display images 401, 402 or 403, and manipulates the decision key 503, the image at the current display position can be replaced by an image at a different display position.

In this embodiment, when images are displayed in accordance with each display layout, images 405 are also displayed that represent functions allocated to the operating keys of the remote controller 114 to controlling the display operation. Further, as will be described later, in this embodiment data for the operating key codes are generated for each display layout (slide).

When an instruction for the registration of a display layout is issued at step S210, the CPU 109 generates a registration file and a reproduction procedure management file on the basis of the registered file name and the selected display layout data, as will be described later, and stores these files in the internal RAM (step S212).

Furthermore, when the registration of a display layout is completed, the CPU 109 displays, on the display device 108, a screen used for determining whether the setting of the image data reproduction procedure using another display layout should be continued. When it is ascertained that the setting of the reproduction procedure should be continued, program control returns to step S203 and the above described processing is repeated.

When the setting of the reproduction procedure is to be terminated, the CPU 109 reads out the registration file and the reproduction procedure management file from the RAM, and controls the card interface 111 to write these files in the LAYOUT directory 607 of the memory card M (step S214).

In this embodiment, as is shown in FIG. 6, a registration file 608 and a display procedure management file 609 are stored in the LAYOUT directory 607.

FIGS. 7 and 8 are diagrams showing the structures of the registration file and the display procedure management file.

In FIG. 7, the registration file is constituted with two sections, HDR and BASE, and multiple sets of parameter data are stored in each section.

Multiple BASE sections are present for each registered image file.

For example, in the registration file in this embodiment, as is shown in FIG. 7, a registration file ID, a file length, the number of sections and the number of parameters are written into the HDR section.

The BASE section includes a file name representing a registered image file, a registration file directory indicating a directory in the memory card M whereat an image file is present, a layout No. for displaying a registered image, a slide group ID representing a slide constituting one picture wherein a registered image is displayed, a slide position No. representing the display position of a registered image on the slide, flag data used to indicate whether an optional setting is designated, and, optional information (X and Y data for the display position of a registered image, SX and SY data of the display size, and display color count data CO).

Normally, the display position is unconditionally defined with a layout No. that represents the display layout; however, when the optional setting is designated, the display position, the size and the number of colors can be forcefully changed.

Each of the parameters may be formed either of bits having a fixed length or of bits having variable lengths, and the structure is determined in advance by systems, or the CPUs of the systems adjust the parameters to match the version management.

In FIG. 8, the display procedure management file is constituted with two sections, HDR and SLIDE. An ID representing the display procedure management file, a file length, the number of sections and the number of parameters are written to the HDR section.

Parameters required for the constitution of a slide are written into the SLIDE section. In this embodiment, these parameters are a slide group ID for designating a registered image file to be displayed on the slide, the number of registered files in the slide, the layout No. for the slide, and remote control code data that represent the reproduction functions of slides and the operational key codes for the remote controller 114, to which the reproduction functions are allocated.

In this embodiment, each time the registration for one display layout (slide) is issued at step S210 in FIG. 2, the CPU 109 generates data for one SLIDE section in FIG. 8, and controls a series of reproduction procedure based on each SLIDE section by using a reproduction procedure management file.

The reproduction operation performed in accordance with the thus designated reproduction procedure will now be described.

Figures 9, 9A, 9B:
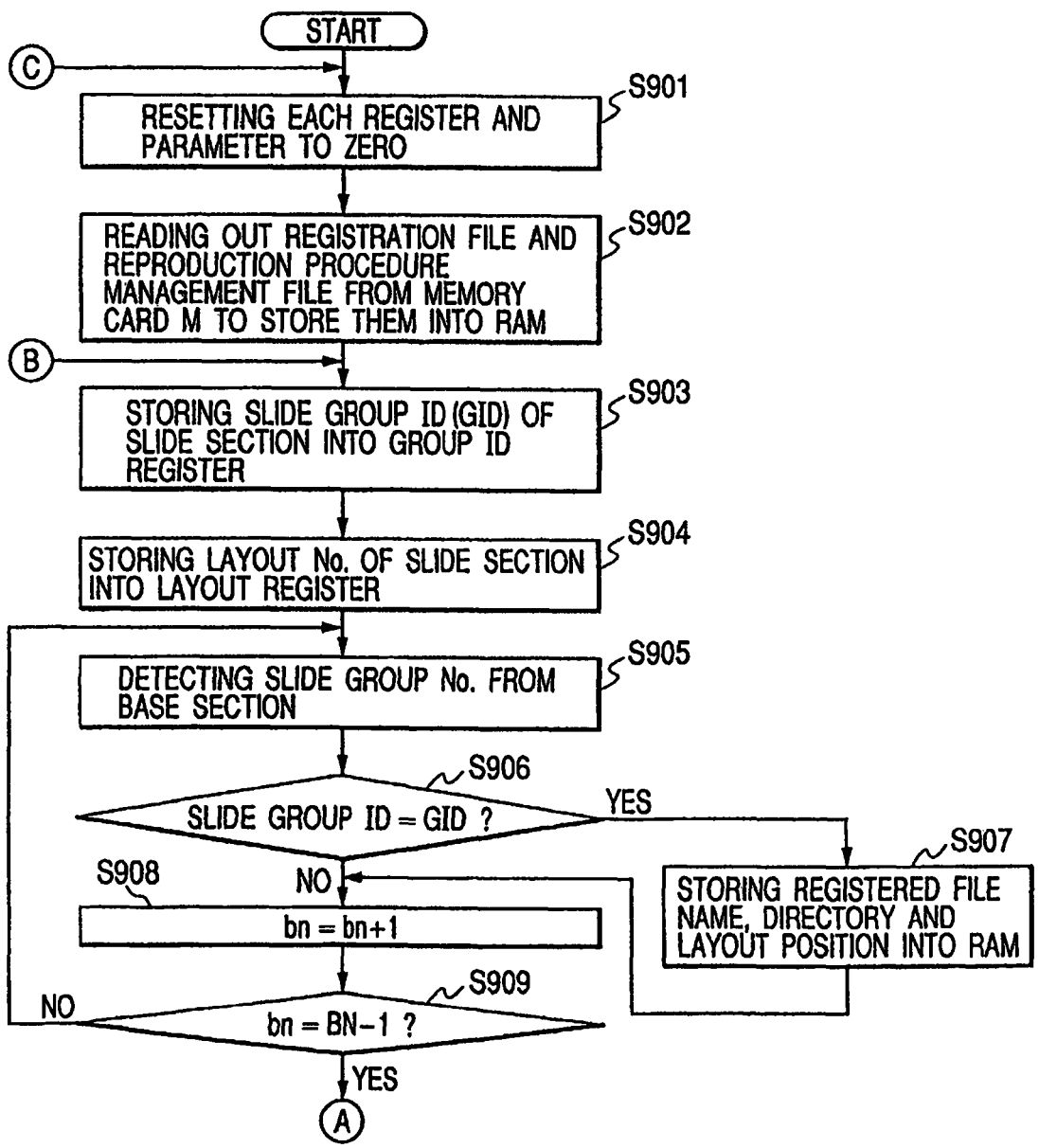
FIG. 9 which is composed of FIGS. 9A and 9B, a flowchart showing the operation performed when slides are reproduced.
Figure 9B:
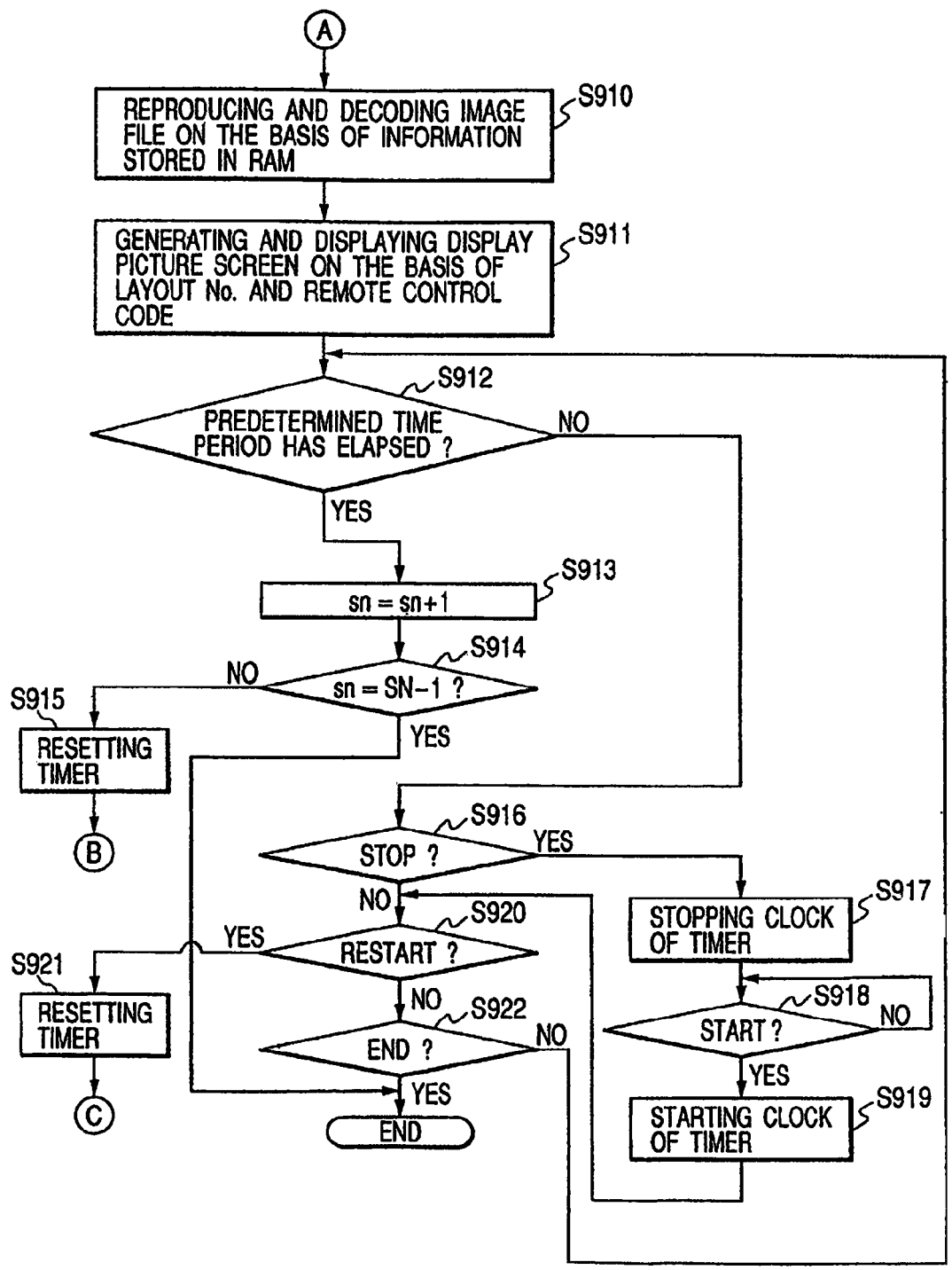

FIG. 9 is a flowchart showing the reproduction operation performed by the CPU 109. When a slide reproduction instruction is issued by the remote controller 114, the processing in FIG. 9 is started.

When the slide reproduction instruction is issued, first, the CPU 109 resets the registers and variables in the internal RAM (step S901), and controls the card interface 111 to read out from the memory card M a registered file and a reproduction procedure management file and store these files in the internal RAM (step S902).

Then, in accordance with the value of a variable sn, indicating the current SLIDE section (this value is 0 because it is reset at the first), the CPU 109 detects, from among the SLIDE sections stored in the reproduction procedure management file in FIG. 8, the slide group ID (GID) of the sn-th SLIDE section, and stores this slide group ID in the group ID register (step S903). The CPU 109 also detects the data of the layout NO. of this SLIDE section, and stores the layout NO. data in the layout register (step S904).

Following this, in order to detect an image to be displayed on the display picture screen (slide) included in the SLIDE section, the CPU 109 detects the slide group ID from a bn-th BASE section in accordance with the value of a variable bn indicating the BASE section in the registered file (step S905). Then, the CPU 109 compares this slide group ID with the value of the GID stored in the group ID register (step S906). When these IDs have the same value, the CPU 109 ascertains that the current file is an image file to be displayed on the display picture screen in the pertinent SLIDE section, and reads out from the BASE section data such as the registered file name, the directory and the layout position and stores in the RAM (step, S907).

Thereafter, the CPU 109 increments the variable bn by one (step S908), and compares the obtained bn value with a predetermined value SB-1, which is smaller by one than a number BN of BASE sections (step S909). When the bn value has not yet reached that of BN-1, program control returns to step S905 and the CPU 109 repeats the above processing.

Whereas when the bn value equals BN-1, the CPU 109 reads out an image file from the memory card M based on the data stored in the RAM at step S907, and the AV decoder 105 decodes the thus obtained data and transmits the decoded data to the graphic processing unit 106 (step S910).

Next, the CPU 109 generates a display picture screen based on the layout No. and the remote control data and transmits to the graphic processing unit 106 (step S911). At this time, the CPU 109 starts the incorporated timer.

A picture screen according to the first SLIDE section in FIG. 8 is then displayed on the display device 108, and the CPU 109 determines whether the timer value exceeds a predetermined time T (step S912). When the predetermined time T has elapsed, the CPU 109 increments the variable sn by one (step S913), and compares the obtained variable sn with a predetermined value SN-1, which is smaller by one than a number SN of SLIDE sections (step S914).

When the value of the variable sn has not yet reached SN-1, the CPU 109 resets the internal timer (step S915) and returns to step S903, whereafter it repeats the above processing for the next SLIDE section. Otherwise, when the value of the variable sn equals SN-1, the CPU 109 ascertains that the series of reproduction procedure has been completed for all the SLIDE sections and halts the display.

When at step S912 the predetermined time T has not yet elapsed, the CPU 109 determines whether the user manipulates the operating key that corresponds to the stop function which is allocated as one of the key code data written in the SLIDE section (step S916). When the operating key corresponding to the stop function (e.g., a key 7 in FIG. 4) is manipulated, the timer is halted (step S917) At this time, the display picture screen is unchanged, and the automatic switching the display picture screens according to passage of time is not performed.

Then, when an operating key corresponding to the start function (a key 5 in FIG. 4) is manipulated, the timer is restarted (steps S918 and S919).

Thereafter, when the operating key corresponding to the restart function (a key 9 in FIG. 4) is manipulated, the CPU 109 resets the timer count value and returns to step S901 to repeat the above processing (steps S920 and S921). Therefore, when a restart instruction is issued, the series of reproduction procedure according to the reproduction procedure management file is repeated from the beginning.

When an operating key corresponding to an end function (not shown in FIG. 4; however, this function can be allocated for an arbitrary operating key on the remote controller 114) is manipulated, the CPU 109 halts the display operation, and terminates the processing. But when no operating key is manipulated, the CPU 109 returns to step S912 and repeats the processing.

When, in accordance with the contents of the reproduction management file, the reproduction operation is controlled in this manner, the display picture screens can be automatically switched in accordance with the display layout written in the individual SLIDE sections, and slide reproduction, whereby images recorded on the memory card M are displayed, can be provided.

As is described above, according to this embodiment, when the procedure of the slide reproduction of image data stored on a memory card are to be designated, slide pictures are generated by automatically selecting one of display layouts that have been prepared in advance, in accordance with the number of display pictures selected by a user. Therefore, since the user need only select a desired image to be displayed, the procedure for the reproduction of slides can be easily set.

Further, since the reproduction functions corresponding to the individual slide pictures are allocated to the operating keys of the remote controller and this allocation is written into the reproduction procedure management file, the user who employs the remote controller for slide reproduction can easily identify the operating keys to which the reproduction functions have been allocated. As a result, various reproduction functions can be performed by using the remote controller.

Furthermore, in this embodiment, since the registered file which designates the image file to be used for slide reproduction, and the reproduction procedure management file which designates the procedure to be used for reproducing individual slides, are both stored on the memory card, even a receiver other than the one for which the reproduction procedure is set up can employ that procedure to perform slide reproduction, without a new reproduction procedure setup being required.

A second embodiment will now be described.

In the first embodiment, for the reproduction of each slide, the image data read out from the memory card are decoded and the decoded image data are written into the still image plane in the video memory 107.

When all the slide display data are to be displayed using only the still image plane, however, since the entire screen can not be displayed on the display device during the period in which image data read out from the memory card are being written into the still image plane, the image display is essentially delayed.

An explanation will now be given for a method whereby such a display delay period is reduced by using multiple planes which are adopted based on the BS digital television broadcast receiver standards.

The system configuration is the same as the one shown in FIG. 1, and the setting up of reproduction procedure and the contents of the registered file and the reproduction procedure management file are also as previously described.

FIG. 11 is a diagram showing the configuration for a graphic processing unit 106, a video memory 107 and peripheral circuits.

In FIG. 11, a writing control unit 1101 controls the writing of data for each plane of the video memory 107. A scaling processing unit 1102 changes the size of image data received from an image decoding unit 1103, which mainly decodes still image file data. A switching unit 1104 selects either image data received from a moving image plane 1109 or image data received from a still image plane 1110, and outputs the selected image data. α blending units 1105 and 1107 control the levels of input data to synthesize images. And adders 1106 and 1108 add data received from a character and graphic plane 1112 to data received from a subtitle plane 1113.

The video memory 107 includes five planes of the moving image plane 1109, the still image plane 1110 and a moving image and still image switching plane 1111, the character and graphic plane 1112 and the subtitle plane 1113.

While referring to the flowchart in FIGS. 10A and 10B, an explanation will now be given for the processing performed in this configuration to generate a display picture screen using the graphic processing unit 106 and the video memory 107.

Figure 10B:
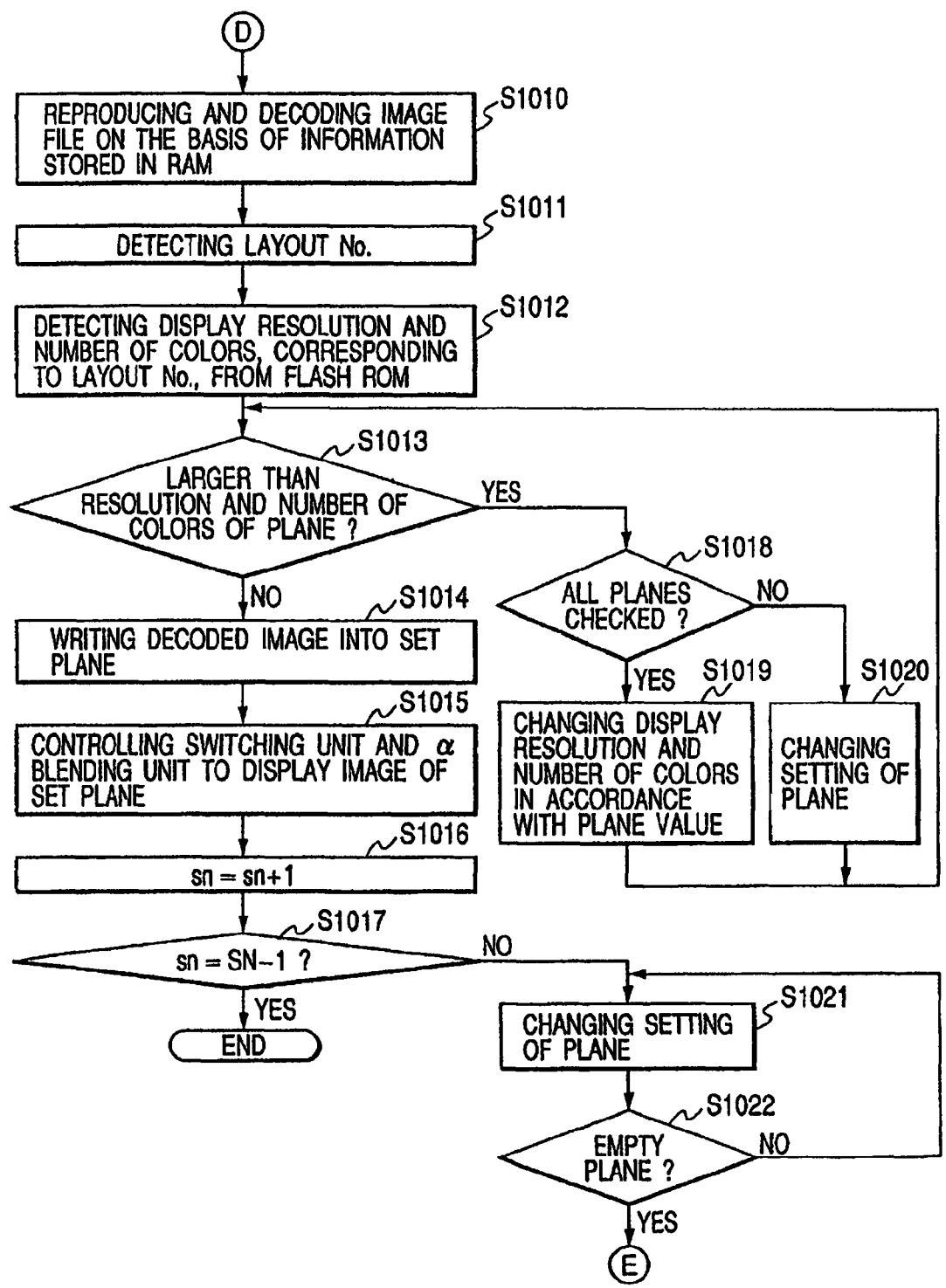
FIG. 10 which is composed of FIGS. 10A and 10B, a flowchart showing the operation performed when slides are reproduced.

FIGS. 10A and 10B are flowcharts showing the reproduction operation of this embodiment. In FIGS. 10A and 10B, mainly, the display picture screen generation is described, and no explanation is given for the display switching process using the timer count value, and the reproduction halting, starting and restarting processes performed upon receiving instructions issued using the operating keys. However, the CPU 109 always monitors the timer count value and each instruction issued using an operating key, and employs an interrupt process to control the operations.

In FIGS. 10A and 10B, the processes at steps S1001 to S1010 are the same as those in FIGS. 9A and 9B. As is described above, the image file to be used for the selected SLIDE section is determined, and as at step S911, the CPU 109 detects the layout No. (step S1011). Then, the CPU 109 reads out from the flash ROM 110 the display resolution and the number of colors that correspond to the layout No. (step S1012).

Following this, a check is performed to determine whether the display resolution and the number of colors that are thus obtained are smaller than the display resolution and the number of colors that are available for the selected plane (e.g., the still image plane 1110) (step S1013).

When the display resolution and the number of colors are smaller than those for the selected plane, the image data read out from the memory card M are decoded. In this embodiment, the image decoding unit 1103 decodes the image file read out from the memory card M; however, as in the previous embodiment, the AV decoder 105 may decode the image data and transmit the decoded image data to the scaling processing unit 1102, which may then change the size.

The scaling processing unit 1102 converts the image data obtained by the image decoding unit 1103 into the size defined by the layout No., and the writing control unit 1101 writes the obtained data to the selected plane (step S1014).

Further, the value of data to be written into the moving image and still image switching plane 1111, the switching unit 1104 and the α blending units 1105 and 1107 are controlled so as to output the image data of the selected plane to the display device (step S1015).

The moving image and still image switching plane 1111 has a depth of one bit and the same resolution (the same number of pixels) as the moving image plane 1109 and the still image plane 1110. When data bits "1" and "0" that are to be written into addresses corresponding to the individual pixels are switched therebetween, the image data transmitted from the moving image plane 1109 or the image data transmitted from the still image plane 1110 is selected and output by the switching unit 1104 for each pixel.

For example, when the image data transmitted from the still image plane 1110 is to be selected and output, the one bit data "0" is written into the address of a pixel corresponding to the image data portion. At this time, the α blending units 1105 and 1107 are so set that they can output the image data received from the switching unit 1104 without changing the data level.

Furthermore, when image data from the character and graphic plane 1112 are to be output, regardless of whether the image data from the moving image plane 1109 or the image data from the still image plane 1110 are selected by the switching unit 1104, the operation of the α blending unit 1105 is controlled so that the value of the data received from the switching unit 1104 is reset to 0, while the α blending unit 1107 is controlled so that the data received from the adder 1106 is output unchanged. As a result, the image data from the character and graphic plane 1112 can be output.

Next, the variable sn is incremented by one (step S1016), and the obtained variable sn is compared with a predetermined value SN-1. When the variable sn and the predetermined value SN-1 match, the processing is terminated (step S1017). When the variable sn does not match SN-1, however, the plane into which image data is next to be written is changed (step S1021), and a check is performed to determine whether image data that has not yet been displayed have already been written to the altered plane (step S1022). When the current plane is not empty, this plane is changed to another one, and the same decision process is performed. But when the current plane is an empty plane, program control returns to step S1003 and the display picture screen is generated based on the next SLIDE section.

In this embodiment, when the currently selected plane is the moving image plane 1109 the still image plane 1110 is selected, and when the currently selected plane is the still image plane 1110 the character and graphic plane 1112 is selected.

When at step S1013 the resolution and the number of colors designated according to a layout No. are greater than the resolution and the number of colors for the selected plane, the image can not be displayed and the selected plane is changed to another, such as the character and graphic plane 1112 or the subtitle plane 1113 (steps S1018 and S1020). Then, when the newly selected plane is still not satisfactory, the display resolution and the number of colors are changed (step S1019).

As is described above, according to this embodiment, since the display picture screen for the slide reproduction is generated by using not only the still image plane but also the other memory planes in the video memory 107, the next screen can be generated in advance without waiting for the display picture screens to be switched. Therefore, as soon as the display picture screens are switched, the next screen can be displayed.

In the receiver shown in FIG. 11, the plane used for slide reproduction is selected in accordance with the BS digital broadcasting standards in Japan. However, when the broadcast reception standards differ from the BS digital broadcast standards, a plane to be used need only be selected in accordance with the pertinent standards.

For example, in FIG. 1, in accordance with the output of the demultiplexer 104, the CPU 109 detects the data of the broadcast standards received from the broadcast station.

Then, based on the data of the broadcast standards, the CPU 109 changes the setting of a plane to which data are to be written during slide reproduction.

For example, for the BS digital broadcast reception standards in Japan, the digital image data used for slide reproduction are written into the still image plane, the moving image plane and the character and graphic plane.

For the corresponding standards in Europe, the α blending values for the individual planes are controlled to switch image data of slides so that only the moving image plane and the still image plane are used for slide reproduction.

With this configuration, even a receiver compatible with standards differing from the broadcast reception standards in Japan can appropriately control the memory to reproduce slides.

In the above embodiments, image data stored on a memory card are reproduced using slides. However, the present invention can also be applied for the reproduction of image data stored on another recording medium.

Further, a recording medium, such as a CD-ROM, on which a program is stored that permits a CPU to implement the above functions, is also included within the scope of the present invention, and the same effects can be provided.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A signal processing method for slide show reproduction which continuously reproduces a plurality of slides, comprising the steps of:
    selecting at least one image data to be displayed on each of the plurality of slides, from among a plurality of image data stored on a recording medium in accordance with a user operation;
    setting a display layout, for each of the plurality of slides, corresponding to a number of the image data selected in said selecting step, from among a plurality of display layouts prepared in advance, and setting an operation key code for implementing a predetermined reproduction function, for each of the plurality of slides;
    storing an ID of each of the plurality of slides, information indicating the image data selected in said selecting step, information indicating the display layout set for each slide in said setting step, and information indicating the operation key code set in said setting step on the recording medium in relation to each other; and
    reading out the plurality of image data stored on the recording medium and the ID of each of the plurality of slides, the information indicating the image data selected in said selecting step, the information indicating the display layout set in said setting step, and the information indicating the operation key code set in said setting step stored on the recording medium in said storing step, and continuously reproducing the plurality of slides in accordance with the ID and information read out from the recording medium.

2. A method according to claim 1, wherein said setting step includes setting a display size and a display position of each of the plurality of image data to be displayed on each of the plurality of slides, and wherein said predetermined reproduction function includes at least one of a play function, a stop function, and a restart function.

3. A method according to claim 1, wherein said setting step is arranged to set the display layout in such a manner that a plurality of candidates of the display layout corresponding to the image data selected in said selecting step are displayed and the display layout is selected from among the plurality of displayed candidates in accordance with the user operation.

4. A non-transitory computer-readable storage medium storing a computer-executable program for implementing a method according to claim 1.

5. A method according to claim 1, further comprising a step of displaying the operation key code set for each slide in said setting step and the predetermined reproduction function corresponding to the operation key code, in the slide show reproduction.

6. A signal processing apparatus for continuously reproducing a plurality of slides, comprising:
    a selecting unit constructed to select at least one image data to be displayed on each of the plurality of slides, from among a plurality of image data stored on a recording medium in accordance with a user operation;
    a setting unit constructed to set a display layout, for each of the plurality of slides, corresponding to a number of the image data selected by said selecting unit, from among a plurality of display layouts prepared in advance, and set an operation key code for implementing a predetermined reproduction function, for each of the plurality of slides;
    a storing unit constructed to store an ID of each of the plurality of slides, information indicating the image data selected by said selecting unit, information indicating the display layout set by said setting unit, and information indicating the operation key code set by said setting unit on the recording medium in relation to each other; and
    a reproducing unit constructed to read out the plurality of image data stored on the recording medium and the ID of each of the plurality of slides, the information indicating the image data selected by said selecting unit, the information indicating the display layout set by said setting unit, and the information indicating the operation key code set by said setting unit stored by said storing unit, and continuously reproduce the plurality of slides in accordance with the ID and information read out from the recording medium.

7. An apparatus according to claim 6, wherein said setting unit is arranged to set a display size and a display position of each of the plurality of image data to be displayed on each of the plurality of slides, and wherein said predetermined reproduction function includes at least one of a play function, a stop function, and a restart function.

8. An apparatus according to claim 7, wherein said setting unit is arranged to set the display layout in such a manner that a plurality of candidates of the display layout corresponding to the image data selected by said selecting unit are displayed and the display layout is selected from among the plurality of displayed candidates in accordance with the user operation.

9. An apparatus according to claim 6, further comprising a display unit constructed to display the operation key code set for each slide by said setting unit and the predetermined reproduction function corresponding to the set operation key code, in the slide show reproduction.

* * * * *